United States Patent [19]

Williams et al.

[11] Patent Number: 4,722,653
[45] Date of Patent: Feb. 2, 1988

[54] MATERIAL HANDLING FOR AUTOMATED ASSEMBLY FACILITY

[75] Inventors: Ronald C. Williams; Barry L. Kendall, both of Concord; Franklin Deaton, Kannapolis; Milton Sedlak, Charlotte, all of N.C.

[73] Assignee: IBM Corporation, Armonk, N.Y.

[21] Appl. No.: 18,835

[22] Filed: Feb. 24, 1987

Related U.S. Application Data

[63] Continuation of Ser. No. 728,923, Apr. 30, 1985, abandoned.

[51] Int. Cl.⁴ .............................................. B65G 1/00
[52] U.S. Cl. ..................... 414/222; 29/33 P; 29/563; 29/564; 29/711; 29/791; 198/346.1; 198/346.2
[58] Field of Search ............. 414/134, 222, 276, 285; 29/33 P, 563, 564, 711, 791; 198/345, 346.1, 346.2, 347, 358, 465.1

[56] References Cited

U.S. PATENT DOCUMENTS

| | | | |
|---|---|---|---|
| 2,884,113 | 4/1959 | Converse, III et al. | 198/358 |
| 3,122,231 | 2/1964 | Pence et al. | 198/358 X |
| 3,442,403 | 5/1969 | Weir | 414/285 X |
| 3,781,974 | 1/1974 | Holzl et al. | 29/568 |
| 3,905,492 | 9/1975 | Maeda et al. | 414/284 |
| 4,014,428 | 3/1977 | Ossbahr | 198/345 |
| 4,035,904 | 7/1977 | Ishizaka | 29/563 |
| 4,053,741 | 10/1977 | Koyama | 198/358 X |
| 4,073,240 | 2/1978 | Fly | 108/24 X |
| 4,144,960 | 3/1979 | Scourtes | 198/339 |
| 4,195,347 | 3/1980 | MacMunn et al. | 364/478 |
| 4,237,598 | 12/1980 | Williamson | 29/568 |
| 4,369,872 | 1/1983 | Sticht | 198/339 |
| 4,489,821 | 12/1984 | Inaba et al. | 198/345 X |
| 4,503,507 | 3/1985 | Takeda et al. | 901/8 X |
| 4,538,950 | 9/1985 | Shiomi et al. | 414/749 X |

*Primary Examiner*—Leslie J. Paperner
*Assistant Examiner*—Donald W. Underwood
*Attorney, Agent, or Firm*—Pollock, Vande Sande & Priddy

[57] ABSTRACT

An automated assembly facility includes a random storage facility for each assembly line conveyor and associated series of assembly stations. The assembly line conveyor is located between the random storage facility and the series of assembly stations. A first conveyor is coupled between plural sources of carriers and the random storage facility. The random storage facility is coupled to the assembly stations by a transfer conveyor so that carriers can be transferred directly from random storage to an appropriate assembly station, obviating the need for the assembly line conveyor to cooperate in this transfer. The layout leaves the assembly station accessible from three sides. Efficient space use is achieved by providing one access aisle for each pair of assembly lines; random storage facilities of two lines are directly adjacent each other.

18 Claims, 9 Drawing Figures

MATERIAL HANDLING FOR AUTOMATED ASSEMBLY FACILITY

This is a continuation of co-pending application Ser. No. 728,923 filed on Apr. 30, 1985, abandoned.

TECHNICAL FIELD

The invention relates to an improved automated assembly facility, and in particular an improved material handling apparatus to improve the ease with which various articles are transported without impeding the transportation of other articles.

BACKGROUND ART

Material handling is an important, and even crucial, component of the overall automation of a manufacturing or assembly operation. Typically, an assembly or manufacturing operation is carried out at a series of work stations, each work station being dedicated to one or a few functions which are required in order to complete the manufacturing operation. In a large number of instances the work stations may be automated, although as will appear below, that is not essential to the invention. Material handling functions required in a manufacturing or assembly operation require that different components be selectly delivered to different work stations at such a rate so as to elimiante the possiblity that a work station is inoperative for lack of component parts. Typically component parts are delivered from areas dedicated for that purpose.

Periodically the carriers become empty and they must be returned to a source of additional component parts where they can be refilled and returned to the work stations. In addition, the product, in the course of its assembly or manufacture, must also be delivered from work station to work station. After the final assembly or manufacturing step, the completed product must be removed from the assembly area and directed to a packaging or shipping area. Typically the product, in the course of its assembly or manufacture, is supported on another carrier (pallet), and as a result carriers must be transported from the packaging or shipping area back to the final assembly area for the manufacture or assembly of additional products. Thus the material handling system must deal with empty and full parts carriers, empty product carriers, carriers with partially completed product, and carriers with finished product. Because the manufacture or assembly operation is serial in nature (e.g. a first process or procedure must be completed before the next process or procedure can be begun), for efficient operation the time required to effect the different procedures along a serial production or assembly line should be balanced, for the overall line can operate no faster than the slowest unit in the line. Movement of partially or fully completed product is of the highest priority because any delay in that motion leads directly to a delay in the overall production rate. On the other hand, the motion of parts carriers and empty product carriers cannot be ignored because these elements too are critical in producing the completed product.

The prior art provides a host of elements for the automated assembly facility, but does not describe how these components can be fit together to achieve the objectives of maximum through-put, flexibility, safety and inventory control, while minimizing cost, space, labor, work in process and down time. Typical of the prior art are Ossbahr U.S. Pat. No. 4,014,428; Ishizaka U.S. Pat. No. 4,035,904; Holzl U.S. Pat. No. 3,781,974; MacMunn U.S. Pat. No. 4,195,357 and Williamson U.S. Pat. No. 4,237,598. These references show a manufacturing operation wherein a plurality of work stations are arranged along a sequential production line. Sticht U.S. Pat. No. 4,369,872 is specifically directed to an assembly facility and he mentions that the conveyor line described therein transports workpieces, and he defines workpieces to include assembly parts and the pallets carrying the workpiece or assembly parts. Converse U.S. Pat. No. 2,884,113 also describes a manufacturing facility in which a conveyor carries both workpieces on which the operation or treatment has yet to be performed and workpieces upon which the operation or treatment has been completed. Several of the references employ intermediate storage between two work stations. However, these references do not treat how the motion requirements of the various different items are prioritized so that the motion of partially completed product is not inhibited or impeded by the motion of full or empty parts carriers, while at the same time ensuring that work stations are not shut down for the lack of required parts. Scourtes U.S. Pat. No. 4,144,960 describes a production system where each work station has a location to store, off the conveyor line, a single unit of work, in addition to the work item actually being worked on.

Clearly the various articles could be transported by dedicated, single purpose transporters. This approach is defective from the standpont of expense, space consumed and crowding the assembly stations. The plural single purpose transporters multiply cost, occupy excessive area, and bringing them together at each work or assembly station is difficult from two points of view. Firstly, it multiplies the assembly station area (additional space is consumed). Secondly, even if the assembly station is automated, access for an operator is required to clear jams, for maintenance, etc., the collection of a large number of transporters impedes this access.

Thus it is one object of the present invention to provide an automated assembly facility which includes an assembly line conveyor and a series of assembly station positioned along the assembly line conveyor, so that work in process can travel along the assembly line conveyor from work station to work station, and which also provides for a supply of carriers to the several assembly stations from a random storage facility wherein the random storage facility is located along the assembly line conveyor on an opposite side of the assembly line conveyor from the series of work stations and operated so that parts carriers can be located in the random storage facility opposite the work station at which they are needed. In accordance with this aspect of the invention, when any particular work station calls for an additional parts carrier, the available parts carrier in the random storage facility directly opposite the work station can be imemdiately transferred directly across the assembly line conveyor into a carrier receiving area at the work station.

In order to provide the desired production rate, a plurality of assembly lines are provided operating in parallel to each other. Since each line is associated with a random storage facility the several lines can be densely packed by placing two adjacent lines with their respective storage facilities directly adjacent each other and treating this dual line as a unit. Other such units are separated by aisles so that the assembly stations of each unit are directly adjacent a line for access. Thus a single aisle serves two lines providing for efficient space consumption.

A single random storage facility is served by a transporting means so that any storage location is accessible. A first conveyor is arranged for transporting carriers from at least two different source locations to the random storage facility. The random storage facility includes a two-dimensional array of storage locations, and an associated series of assembly stations distributed along one dimension of the storage locations. Thus the carriers transported by the first conveyor are transferred by the transporting means to selected locations in selective ones of the random storage facility, depending on the contents of the carrier. In this fashion, when a particular work station requires a new supply of parts, a new supply of parts is available in the random storage facility at the appropriate location so that the new supply of parts can be transported across the assembly line conveyor directly in to a receiving area at the work station. Carriers which have been depleted of their contents are ejected from the carrier receiving area directly onto the assembly line conveyor. Each assembly line conveyor includes, adjacent an outlet end, a coupling conveyor for transporting articles carried by said assembly line to the first conveyor. In addition to different component sources associated with the first conveyor, the first conveyor is also associated with a packaging and shipping area to which carriers with completed product are delivered. The first conveyor then carries empty product carriers from the packaging and shipping area back to the random storage facility for later transfer to a work station when needed. The packaging area is another source of carriers.

Thus the invention provides a facility for automated assembly of a product comprising:

a first conveyor for transporting carriers from at least two different source locations to a random storage facility, said random storage facility comprising a two-dimensional array of storage locations and transporting means for moving carriers from said first conveyor into a selected storage location and for moving carriers out of a selected storage location, an assembly line conveyor positioned adjacent to and extending along one dimension of said two-dimensional array of said storage facility, a series of assembly stations positioned along said assemlby line conveyor opposite to said random storage facility, at least one of said assembly stations having two carrier receiving areas located at different positions along said one dimension, and transfer means associated with said random storage facility and assembly line conveyor and located directly opposite one of said two carrier receiving areas to trasnsfer a carrier provided to said transfer means by said transporting means directly across said assembly line conveyor into one of said carrier receiving areas.

Typically the assembly station includes a work area and one or more carrier receiving areas. The work area may be occupied by a carrier or pallet for work in process, and one or more of the carrier receiving areas may locate other (component carrying) carriers. Components then are transferred from a carrier and placed on the work in process. The work in process carrier is then ejected onto the assembly line conveyor for transport to the next assembly station. Carriers depleted of components are also ejected onto the assembly line conveyor for transport via the coupling conveyor back to the first conveyor. Completed product carrying pallets are also ejected onto the assembly line conveyor and transported, from an outlet end of the assembly line conveyor via the coupling conveyor to the first conveyor. In the case of empty parts carriers, these are transported by the first conveyor back to a sub-assembly or source area wherein they can be refilled. Completed product is transported by the first conveyor to a packaging and shipping area, and empty carriers return from the packaging and shipping area via the first conveyor back to the random storage facility.

BRIEF DESCRIPTION OF THE DRAWINGS

The present invention will now be further described in the following portions of this specification taken in conjunction with the attached drawings in which like reference characters represent indentical apparatus and in which.

DETAILED DESCRIPTION OF A PREFERRED EMBODIMENT

Figure 1:
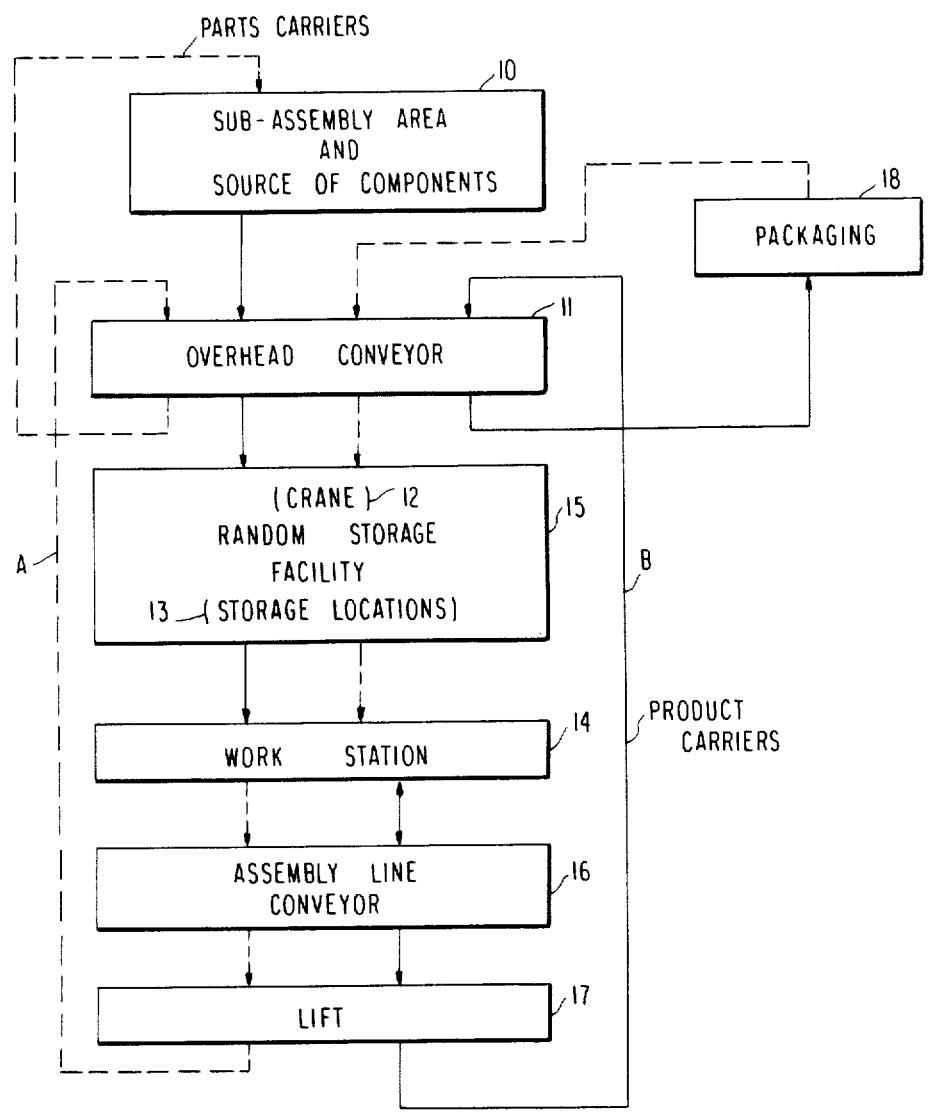
FIG. 1 illustrates the relationship between the various resources in the automated assembly facility, and the manner in which various articles are conveyed to and from these resources by transport devices.

The various components of the automated assembly facility of the invention include one or more sub-assembly or source areas wherein components required for insertion or attachment to the product are manufactured or at least loaded into carriers. The components are loaded on carriers and transported by a first conveyor to the vicinity of the final assembly area. A packaging and shipping are is coupled to the final assembly area via the first conveyor, and completed products are transported by the first conveyor to the packaging and shipping area loaded on other carriers (specifically, pallets). As a product is packed for shipment, its carrier (pallet) becomes empty and it is transported by the first conveyor back to the fianl assembly area. Preferably both carriers may have a common footprint. Thus two types of carriers approach the final assembly area, parts carrying carriers and empty pallets. These are directed to a random storage facility. The random storage facility includes one or more series of two-dimensional arrays of storage locations served by dedicated transporters (cranes) so that any carrier can be located in any one of the storage locations. Associated with each random storage facility is a different assembly line conveyor, and located along each assembly line conveyor is a series of work stations (or assembly stations). Since each array of storage locations is two-dimensional in nature and since the work stations are located along one dimension of this array, each array includes a row of storage locations (sometimes called ready locations) which are arranged to be co-planar with the assembly line conveyor. Transfer means are associated with each of these ready storage locations so that carriers can be transferred across the assembly line conveyor into a work station. FIG. 1 shows the flow of different types of carriers through the various resources of the automated facility. The automated facility includes one or more sub-assembly areas 10, an overhead (or first) conveyor 11, a random storage facility 15 including a crane 12 (0or transport means) which can transport carriers to selected storage locations 13 in an array of storage locations. A work station 14 is another element of the facility (representing all of the work stations). The assembly line conveyor is represented at 16, and 17 identifies a lift (or coupling conveyor) coupling the assemlby line conveyor with the overhead conveyor 11. Finally, a packaging and shipping area 18 is identified. Two paths through the resources are identified, a path A for carriers which are associated with component parts and a second path B identified with carriers associated with work in process or completed product. As noted by the legend at the bottom of FIG. 1, a solid line identifies loaded carriers, whereas a dashed line identified empty carriers. To describe path A we begin at a sub-assembly area where a particular component is manufactured or at least loaded into carriers. carriers loaded with the particular component are inserted into the overhead conveyor 11 where they are transported to the random storage facility 15. Carriers are transferred by the crrane 12 to a particular storage location 13. As will become apparent below, the crane 12 may actually move a carrier from one storage location 13 to another as required. Eventually, when the particular carrier is needed, it is transferred into a particular work station 14. The carrier will remain at the work station 14 until it is depleted of the components it had carried. The carrier is then ejected into the assembly line conveyor 16 where it is transported along the final assembly line past one or more work stations, to the lift 17. The lift 17 transfers the carrier to the overhead conveyor 11 which eventually carries it back to a sub-assembly area for reloading with additional components.

Carriers (or pallets) associated with work in process travel the path B. Empty pallets leave the packaging and shipping area 18 and are transported via the overhead conveyor 11 to the random storage facility. Empty product carriers are stacked at the packaging area 18 and are stored in the random storage facility 15 as a stack. At the random storage facility the crane 12 will transport a stack of pallets to a particular storage location, and as was the case with parts carriers, the stack of empty pallets may be transported from one storage location to another by the crane 12. Eventually, when an empty pallet is required at a work station 14, a stack is transferred into the work station. At this initial work station, pallets are unstacked and placed on the assembly line conveyor 16 one at a time. The pallet carrying work in process, in contrast to the parts carriers, is transported by the assembly line conveyor 16 to a plurality of other work stations 14, thus FIG. 1 shows by the double headed arrow that the pallet on which the product is built travels from station to station along the assembly line conveyor 16. When all the assembly steps have been completed, the carrier is transported by the assembly line conveyor 16 to the lift 17 where it is transfered to the overhead conveyor 11, and on the overhead conveyor 11 back to the packaging and shipping area 18. FIG. 1 shows the wealth of articles in motion in the assembly line region. The motion of these various articles must be coordinated so that motion can occur without impeding other articles or their motion. At the same time this concentrated region should be geographically arranged to provide operator access, and at the same time densely packed so as to be efficinet from space consumption. The solution to this problem should also provide for flexibility in the motion sequences which can be implemented. It is this problem which is solved by the invention.

Figure 2:
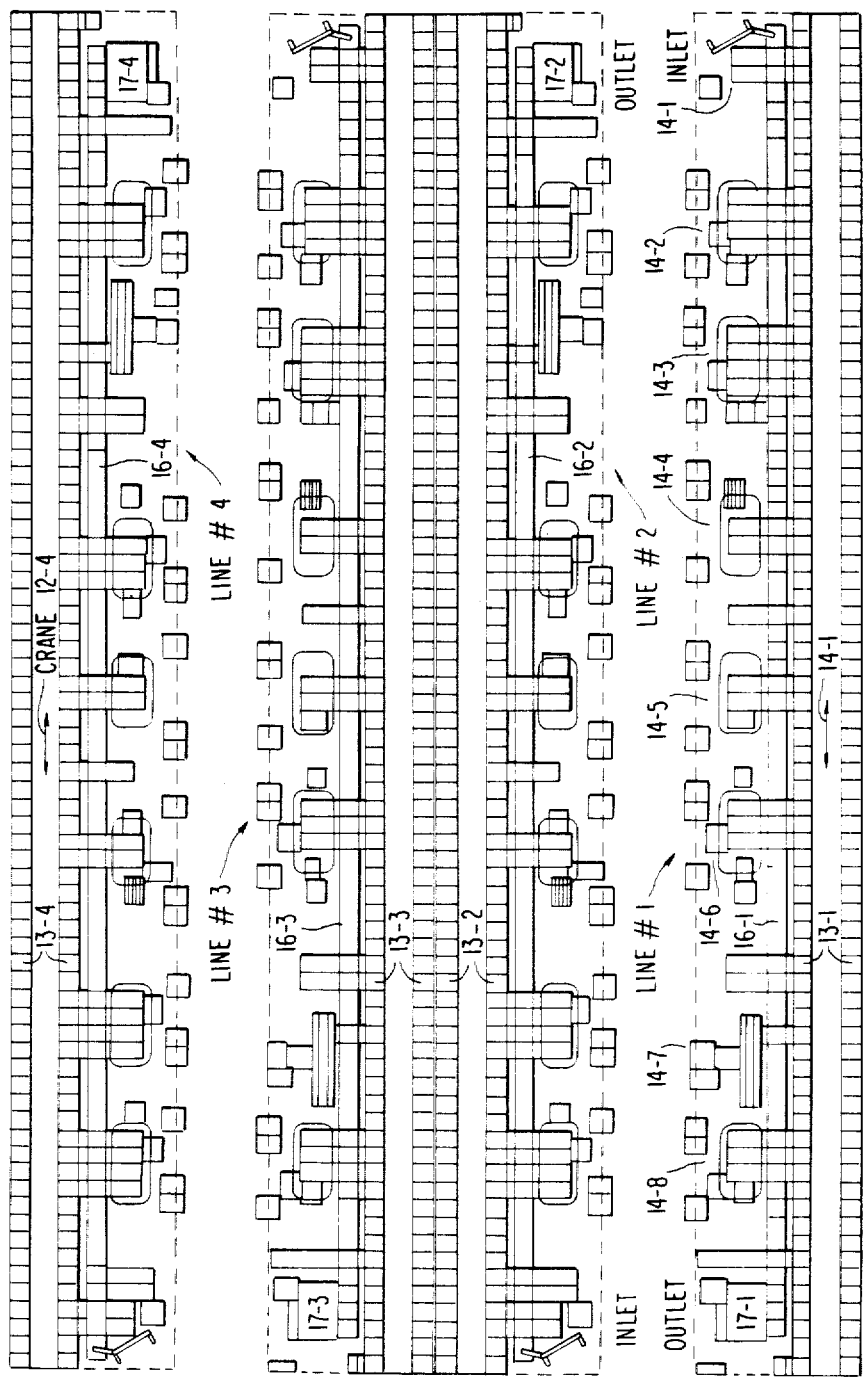
FIGS. 2 and 3 are (part section) plan views respectively of four and two typical final assembly lines illustrating the relationship of the various components of these assembly lines.

FIG. 2 is a (part section) plan view of four final assembly lines, lines #1-4 showing the random storage facility 15 partially in section to reveal the path of a crane 12. It should be apparent that one or more final assembly lines may be employed; in an embodiment of the invention actually constructed eight such final assembly lines are used located in the pattern established by FIG. 2 so that only four aisles are needed. Each final assembly line includes an assembly line conveyor 16 (and thus conveyors 16-1 through 16-4 are shown in FIG. 2). Each assembly line conveyor 16 has an inlet end and an outlet end, the inlets and outlet for lines 1 and 2 are specifically called out in FIG. 2. Located along each assembly line conveyor 16 is a series of work stations 14, thus assembly line 1 includes work stations 14-1 through 14-8 inclusive. Like the number of assembly lines, the number of work stations is also variable within wide limits. Each work station may be associated with a robot which is capable of manipulating components and work in process so as to perform one or more different assembly operations. At the outlet end of each assembly line conveyor 16 is a coupling conveyor or lift 17. Articles transported to the lift 17 can be transported to the overhead conveyor (which is not illustrated in FIG. 2). Associated with each assembly lines is a random storage facility 15 including a two-dimensional array of storage locations 13, each array of storage locations 13 is served by a transport means or crane 12. FIG. 2 shows the path of each of the different cranes for the four assembly lines (although the crane itself is not illustrated in FIG. 2). Each crane 12 can communate with the overhead conveyor 11 for removing carriers from the overhead conveyor 11 and place them in selected locations in an associated storage array 13. In this fashion, empty pallets and parts carriers can be removed from the overhread conveyor 11 and selectively located in the storage array 13. FIG. 2 illustrates two different relationships between adjacent assembly lines. Lines 1 and 2 show one of these relationships wherein the two lines are separated by an aisle available for operators to move about. Adjacent lines 2 and 3 illustrate the second relationship wherein the storage arrays 13 of each of the lines are directly adjacent each other. As should be apparent from FIG. 2, the lines are not mirror images of each other in that the inlet to line 1 is adjacent the outlet of line 2, etc. The direction of motion (inlet to outlet) of one line (1, 2, 3 or 4) is opposite the direction of motion of the adjacent line (2, 1 or 3, 2 or 4, 3). This ensures an operator's view of any line, while the operator is in the aisle, is identical.

That is, the inlet is to the left and the outlet is to the right regardless of which line is being viewed from the associated aisle. The FIG. 2 geography satisfies the twin criteria of space efficiency and station access. All article motion in/out from a station is concentrated on only one of the four sides of the stations. Thus by providing adequate spacing of stations (in the direction of motion of the associated conveyor 16) the other three sides of the station are accessible. Further, as shown in FIG. 2 only two aisles are required for four lines (or three aisles for six lines, four aisles for eight lines, etc.).

Figure 3:
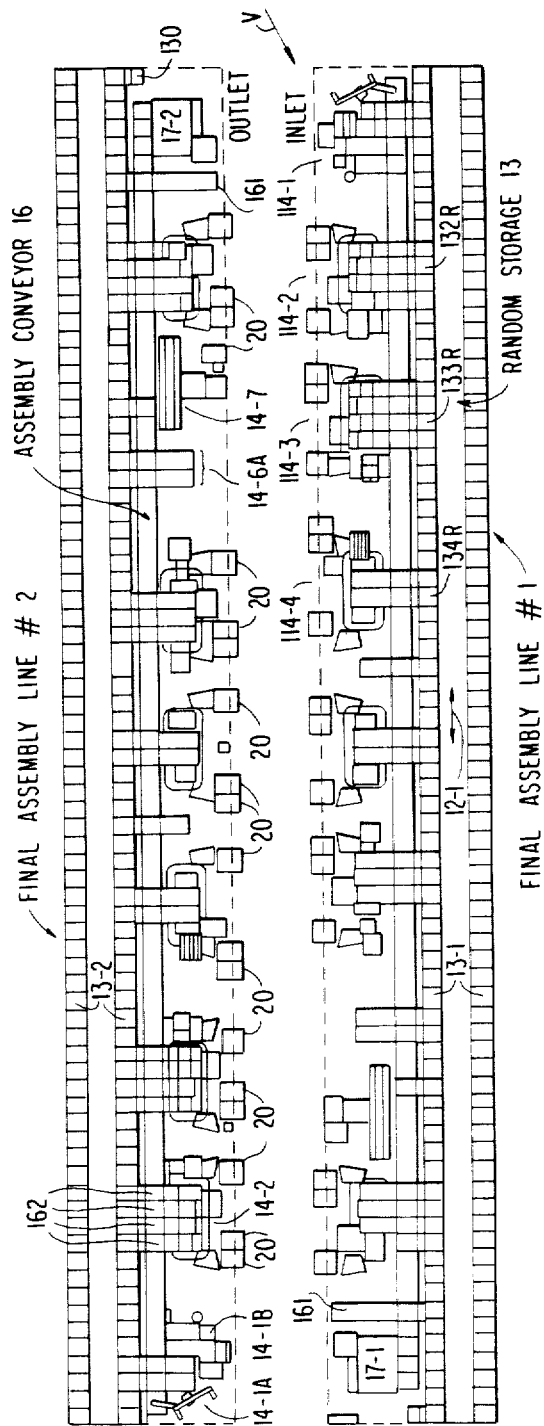

FIG. 3 is a more detailed view of final assembly lines 1 and 2 (of the four shown in FIG. 2). FIG. 3 identifies (in addition to the apparatus already referred to) the reject spur 161, which is located after the final test station 14-7. the controller 130 for the random storage facility is identified as are various other controllers 20 associated with the work stations 14-2 through 14-8. In the embodiment of the invention constructed the controllers 20 comprise IBM Series 1's and/or IBM PC/XT's with associated printers and keyboards. The work station 14-6A is provided for manual operations. In the final assembly line 2, the first work station is identified as including robots 14-1A and 14-1B. The robot 1A is a non-programmable lift and carry tool whereas the robot 14-1B is a programmable pick and place robot arm. The other automated work stations each includes a robot supported on a box frame with is cantilevered over the work station to perform assembly or test operations.

Figure 4:
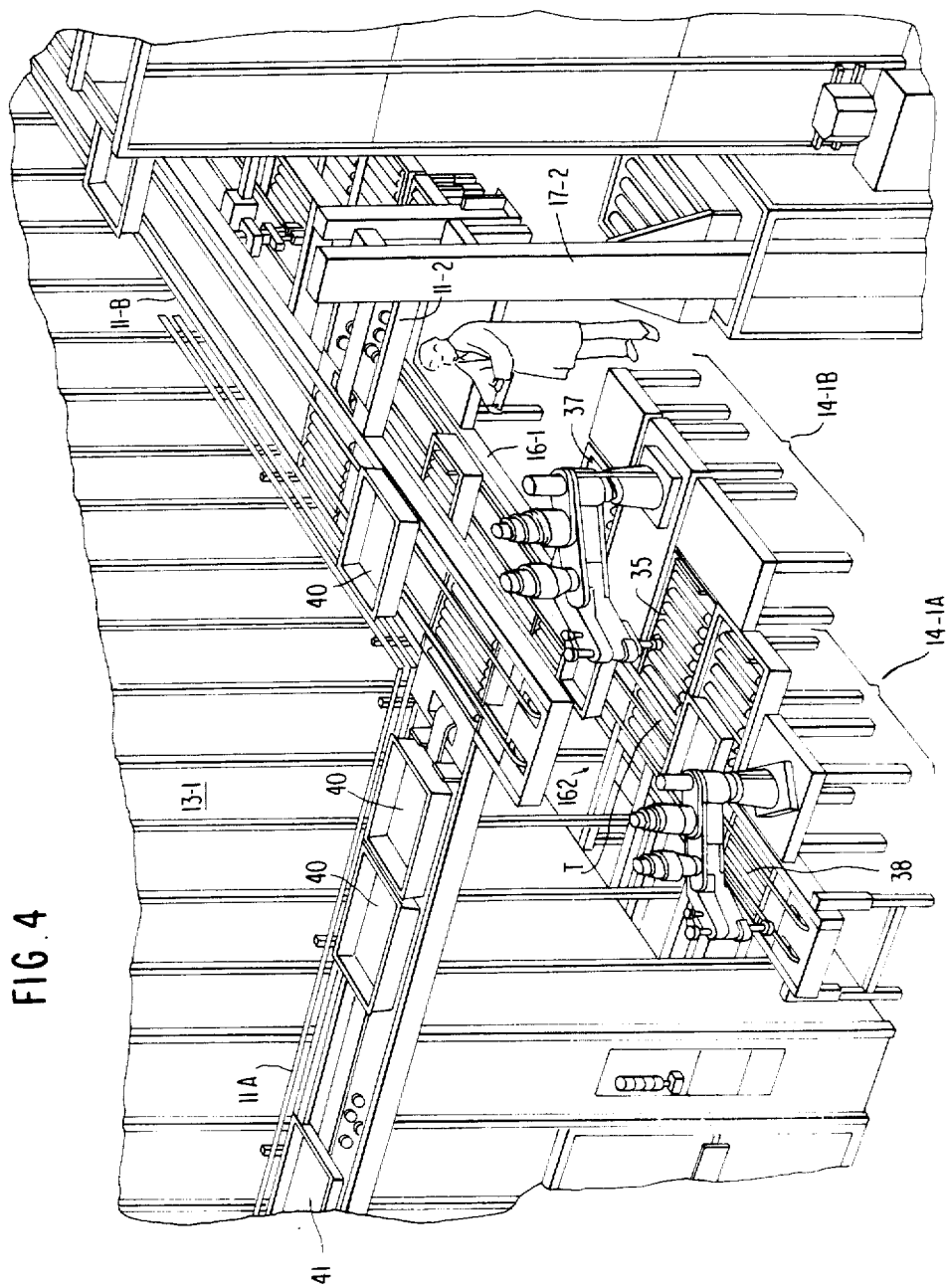
FIG. 4 is a perspective view of portions of two lines taken from the vantage point of the arrow V in FIG. 3.

In order to see the relationship between the overhead conveyor (which is not shown in any of FIGS. 2 or 3) and the series of work stations 14 and assembly conveyor line 16, refere to FIG. 4. FIG. 4 is an isometric view of assembly line 1 looking along the direction of the arrow V (FIG. 3).

Accordingly, FIG. 4 shows the inlet end of assembly line 1 and a portion of the outlet end of assembly line 2. More particularly, and in connection with assembly line 1, the work station 14-1 including manipulators 14-1A and 14-1B is shown. The random storage array 13-1 is also illustrated. As shown in FIG. 4, the ready row of the storage location 13 co-planar with the assembly line conveyor 16-1 includes spurs 162 (or transverse conveyors) communicating with the assembly lines conveyor 16-1 and capable of transferring carriers delivered by the crane 12-1 across the assembly line 16-1 into a carrier receiving area of an assembly station. More particularly, the assembly line conveyor 16 provides one or more padded chains which move in the direction from inlet to outlet and support carriers. Located between the transverse boundaries of the conveyor line 16 and normally below the lowermost level of a chain supported carrier is a set of powered rollers T extending longitudinally of the conveyor line so that powered rotation of the rollers will impart motion transverse to the conveyor line. On either side of the conveyor line 16 aligned with the powered rollers T are other motion inducing conveyors forming an extension of the powered rollers. This is collectively referred to as transverse conveyor 162. When a transfer is to be made from a first to a second side of the conveyor line, the powered rollers are raised slightly above the conveyor line and energized. The extensions are also energized. An article on one such extension 162 is thus propelled transverse to the conveyor line 16. As the article reaches the conveyor line 16, the raised powered rollers support and propel the article across the conveyor line 16 to be received by the other such extension leading to and forming a carrier receiving area such as 35. The transverse conveyor 162 is bidirectional so that a carrier can be transferred in either direction across the assembly line conveyor 16. The same transverse conveyor 162 can also be used to move a carrier from one extension onto (not across) the conveyor line 16 whereafter the carrier is propelled toward the outlet of the line 16. It is this latter operation of the transverse conveyor 162 which is used to eject a carrier from an assembly station onto line 16 to move the carrier to the next assembly station or to lift 17.

FIG. 4 shows carrier receiving areas 35, 36 and 37. In carrier receiving area 36 for example, a pallet from a stack of pallets delivered from a spur or extension 162 can be removed by the pick and place robot 14-1A and placed in the work area 38. The work area 38 is an in-line queue, and when the conveyor 16-1 is powered an empty pallet located in the area 38 will be conveyed toward the outlet end of the conveyor 16-1. The robot 14-1B can extract an initial component (such as a product base) from the carrier receiving area 35. The pallet on conveyor 16 is received in a work area (not shown) adjacent manipulator 14-1B. The robot 14-1B may also being the assembly operation by inserting or attaching other components to the base. The component as so modified is then located on the pallet at the work area. Thereafter, the pallet carrying the initial component is ejected onto the assembly line conveyor 16-1 for transfer to the second assembly station.

FIG. 4 also shows components of the overhead conveyor 11, including components 11A and 11B. Typical (parts) carriers 40 are shown on the overhead conveyor 11, as well as a stack of empty (pallet) carriers 41. FIG. 4 also shows the lift 17-2, and a spur 11-2 of the overhead conveyor 11 which can be used to transfer articles from the lift 17-2 to the overhead conveyor 11. Not shown in FIG. 4 are pallets carrying completed product which also travel on the overhead conveyor 11, as well as carriers 40 which are loaded with parts or components and destined for a particular random storage array 15.

Figure 5:
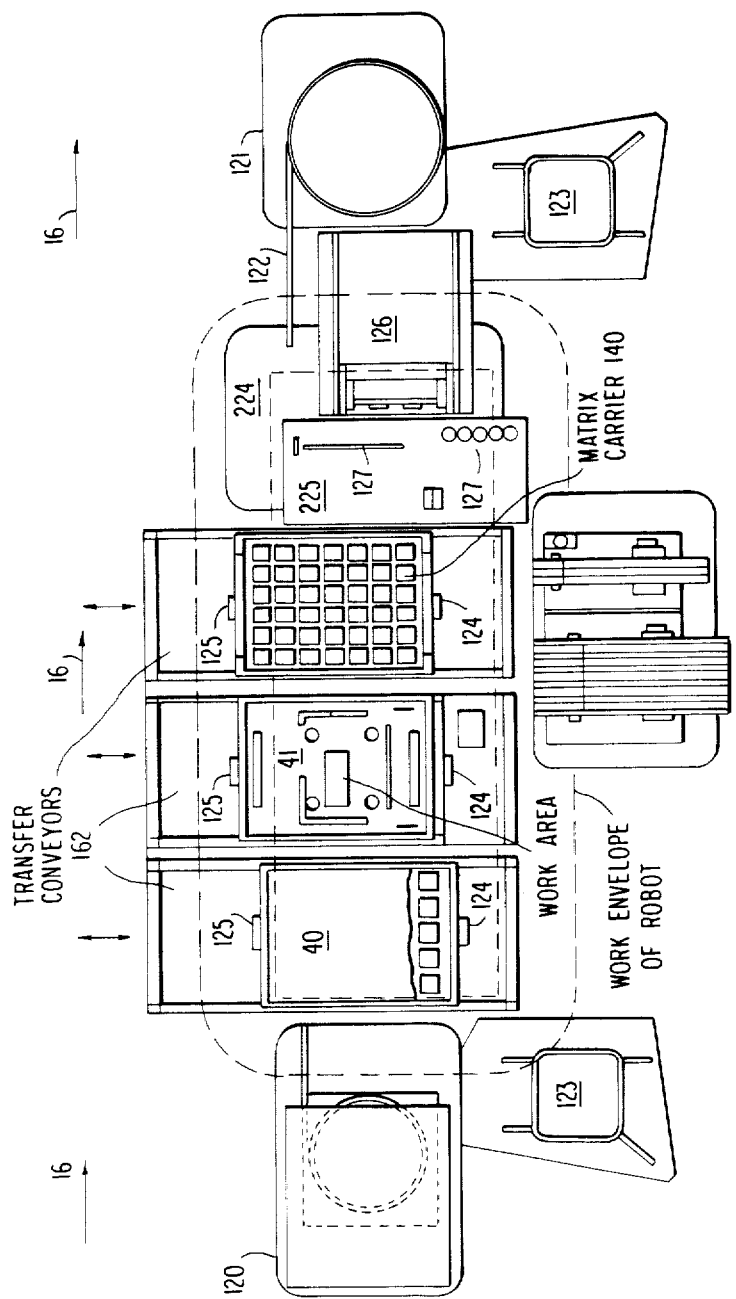
FIG. 5 is a plan view of a typical assembly station.
Figure 6:
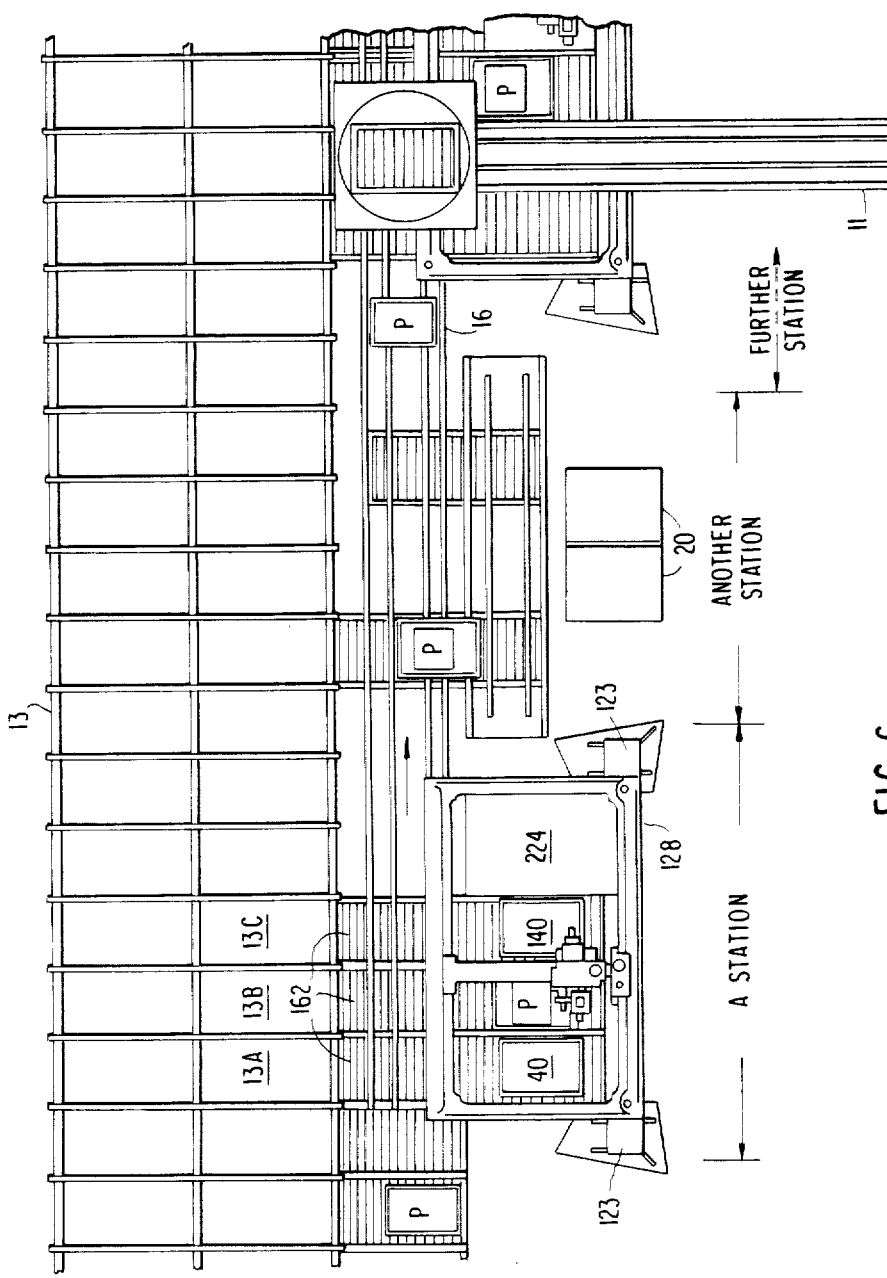
FIG. 6 is a plan view in more detail of a portion of a typical assembly line and the relationship between the components associated therewith.

FIG. 5 shows a plan view, in more detail, of a typical work station 14. To orient the reader, the arrow 16 identifies the location and direction of motion of the associated assembly line conveyor 16. The transfer conveyors 162 each provide a path of motion (in the direction of the double headed arrow) for transferring a carrier from a particular (ready) location in a storage array 13 (which is on the opposite side of the conveyor 16 from the work station itself). As a carrier is transferred by the transfer conveyor 162 from a location in a storage array 13, it abuts a stop 124 to locate the carrier and then a movable clamp 125 secures the carrier in the desired location. FIG. 5 pictures two different types of parts carriers, one shown at 40, and a matrix parts carrier 140 (these are shown in more detail in FIGS. 8 and 9, respectively). The work envelope of the robot is shown within the dashed line (the robot arm is not shown in FIG. 5 to avoid obscuring the other components), however the robot arm is supported on stands 123 and cantilevered over the work area in which the pallet 41 is located. The pallet 41 includes a plurality of apertures 41A. These allow vertically moving rods (which register with the apertures 41A) to lift a partially completed product off the pallet 41 if the particular assembly operation carried out at the work station requires that capability. With this capability work may be performed on both surfaces (top and bottom) of the product. The typical work station shown in FIG. 5 includes vibratory bowl feeders 120 and 121 (a chute 122 for the bowl feeder 121 is illustrated). Work tables 224 and 225 are also provided for supporting a magazine feed 126 and tooling 127 with which the robot may cooperate to orient and locate various components on the partially completed workpiece. Components for the vibratory feeders may also be carried from a source 10 by the overhead conveyor 11 to the random storage facility 15. When required the carrier is extracted from a random storage location, and placed in one of the ready locations. From there the carrier is transferred into a carrier receiving area of a work station by the transfer conveyor 162. An operator manually transfers components to the bowl feeder. The now empty carrier is moved (manually) to a conveyor re-entry point (see FIG. 6). FIG. 6 is a plan view of two typical work stations 14 and a portion of a further typical work station 14. The plan view shows the assembly conveyor 16 (it also shows a portion of the overhead conveyor 11). As seen in FIG. 6 the random storage facility 13 is located on the opposite side of the conveyor 16 from the various work stations 14. In FIG. 6 the frame 128 of the work station is illustrated showing how the frame is cantilevered over the carrier receiving and work areas. FIG. 6 pictures two parts carriers 40 each in its respective carrier receiving area and a pallet P located in the work area. FIG. 6 is convenient to show the transfer conveyors 162 and the manner in which they are associated with dedicated ready locations 13A–13C, respectively, in the random storage facility 13. Not seen in FIG. 6 is the crane 12 which can move carriers to selected locations in the array of locations. FIG. 6 does not shown the feeder bowls and the robot tooling which had been illustrated in FIG. 5. The another station of FIG. 6 does not include a robot or manipulator. This type of station is used to reinduct carriers to the conveyor 16 in a controlled fashion.

Figure 7:
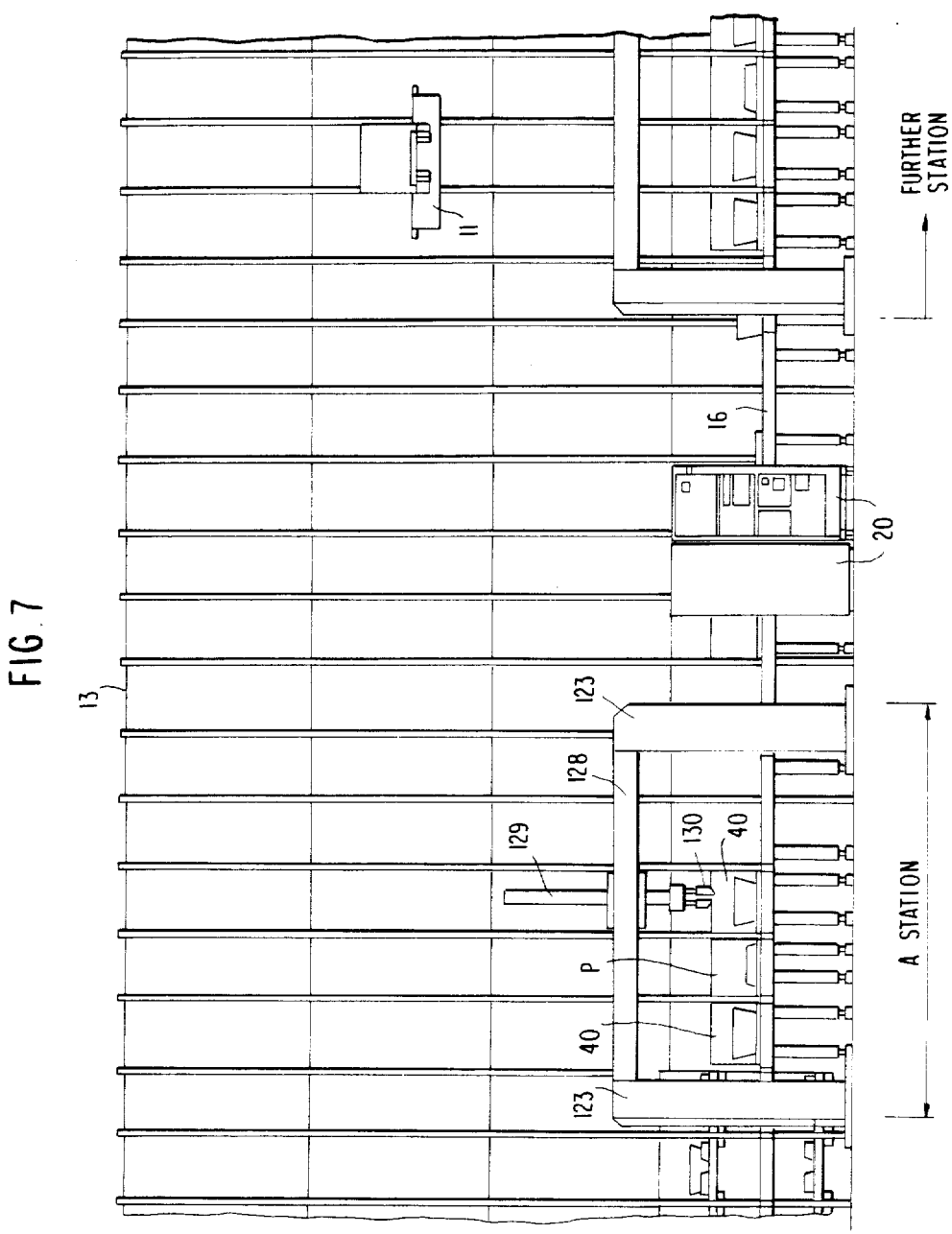
FIG. 7 is an elevation view of the same region of a typical assembly line shown in plan view in FIG. 6.

FIG. 7 is a front elevation of the same region whose plan view is shown in FIG. 6. The first assembly station shown in FIG. 7 shows the robot supports 123 supporting the frame 128 on which is supported a robot arm 129 at the end of which are attached robot grippers 130. In FIG. 7 the grippers 130 are located above a carrier 40 in one carrier receiving area. The other carrier receiving area of the station includes another carrier 40, and the work area has a pallet P located therein. The relationship to the conveyor lines 16, of the various stations, and the overhead conveyor 11 is also represented in FIG. 7. The reader can see in FIG. 7 how the product can be raised above the pallet P (by rods passing through the apertures 41A—see FIG. 5) to register the product. Thereafter the grippers can extract a component (from a carrier 40 or 140 or from some other source) and manipulate it for insertion into or attachment to the product. After all operations are concluded the product is lowered back to the pallet P and the pallet is ejected onto conveyor 16.

Figure 8:
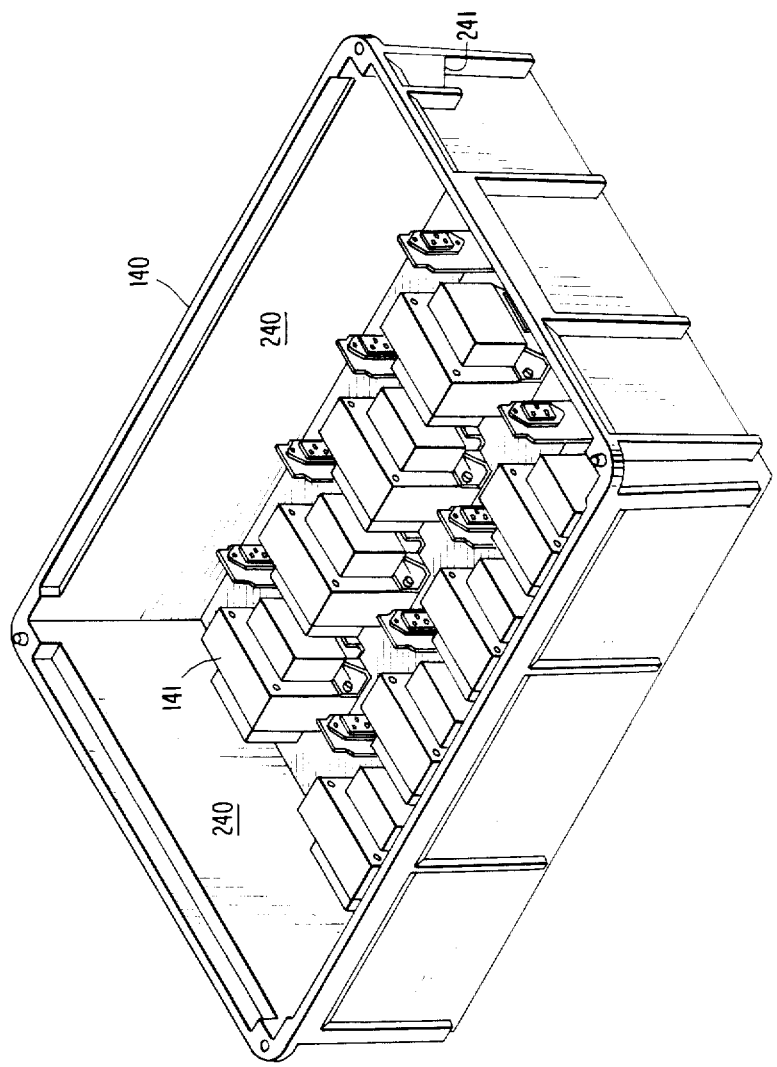
FIGS. 8 and 9 are perspective views of two different types of carriers used to transport articles in the automated facility of the invention.
Figure 9:
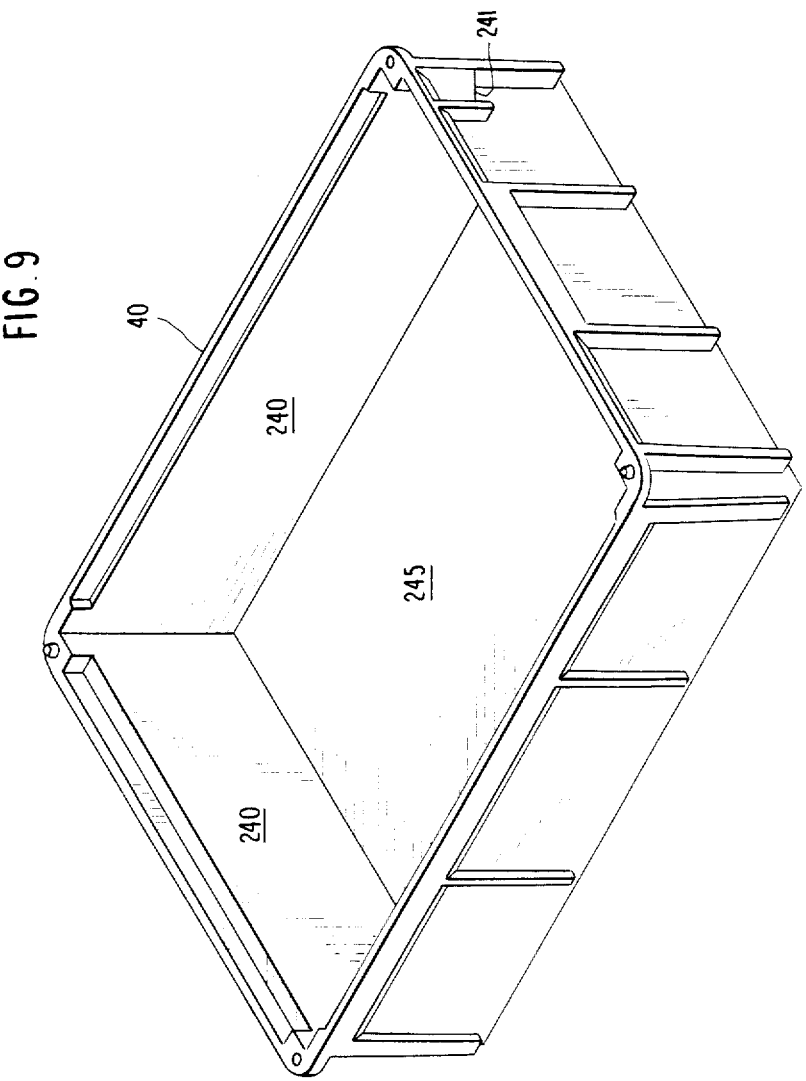

FIG. 9 shows a typical carrier 40. Carrier 40 is used for the supply of component parts to the various work stations. The carrier 40 includes a plurality of up-standing walls 240 surrounding an enclosed volume partially defined by a bottom wall 245. Located at one outside corner of the carrier 40 is a sloping surface 241 which forms a V-notch which cooperates with a cylindrical rod on forward stop 124 (FIG. 5) area for accurately locating the carrier 40 in a direction parallel to the conveyor line 16. FIG. 8 shows a similar carrier 140 with a matrix insert which orients and locates various components 141 in a readily identifiable position for the robot to pick. The matrix is located relative to the V-notch formed by the sloping surface 241 so that when the carrier 140 is accurately located in a carrier receiving area at a station, the various components 141 are accurately locatable with respect to a fixed reference to facilitate accurate picking of each of the components.

The assembly line conveyors 16 and the transfer conveyors 162 as well as the carrier receiving areas and work area consist of a padded chain conveyor system available from the Rapistan division of Lear-Siegler, Inc. under the name "Production Management System" (PMS). The particular random storage facility employed in an embodiment of the invention is available from Litton Industries.

OPERATION

Prior to commencing operation on the final assembly line, the random storage facility adjacent each assembly line is loaded with a stack of empty pallets (preferably in the vicinity of the inlet for each assembly line) and at least one carrier of each different component which is provided by carrier. These component carriers are located at ready locations in the random storage facility adjacent the assembly stations at which they will be used. More particularly, while extra supplies of pallets and components part carriers may be distributed in various storage locations, a supply of empty pallets is necessary at the storage location opposite the assembly station at which empty pallets are required. Likewise, a laoded component carrier is necessary in each ready location of the random storage facility directly opposite the carrier receiving area at which the particular component is needed. The empty pallets and components are then transferred across the assembly line 16 and located in the carrier receiving area at the assembly stations where they will be used. Thereafter, additional empty pallet stacks may be moved by the crane 12 into the location from which the pallets were just removed so as to be ready for transfer when the pallet stack now at the assembly station is exhausted. Additional component carriers can also be transported from their respective sources over the overhead conveyor to the crane 12 at which they can be properly located including at least the ready locations from which the component carriers have just been vacated, so that each component carrier located in a carrier receiving area of a work station will have a corresponding loaded component carrier in the ready location of the storage array from which its predeccessor had been removed. At the first work station the product base is removed from a component carrier, other assembly operations may be a carried out, and the base is finally placed on a pallet which is transferred to the work area. the pallet can be ejected from the work station onto the conveyor where it can travel toward the next work station. Workpiece pallets may be routed from one assembly station directly to the next, if the next work station has a free carrier receiving area for it. Preferably, however work piece loaded pallets are not routed directly into a work station. Rather, a location in the storage facility 13 directly opposite the work area of each station is dedicated to a unit queue for each work station. This unit queue stores work in progress until it is needed at the work station to which it can be directly transferred across the conveyor 16. In this fashion, a pallet carrying the product is transferred from the work area of one station, to the storage facility adjacent a next work station, then, when needed across the assembly line conveyor 16 into the next work station; when the work is completed the pallet is ejected out of the next work station and down the assembly conveyor 16 to the next appropriate location in the storage facility, etc. Particularly, a typical pallet can travel from station 114-1 to a ready location such as 132R (see FIG. 3) even while station 114-2 is occupied with a prior product. At such time as the prior product is ejected to conveyor 16 to clear station 114-2 the product at ready location 132R is transferred into station 114-2. Similar ready locations are provided for other stations, see 133R (station 114-3), 134R (station 114-4), etc. The transverse transfer is made by the transfer conveyor 162, see FIG. 5. After being ejected from the last assembly station in the line, the completed product passes the reject station where it is transferred if previous testing indicates it is unacceptable. Alternatively, the product carrying pallet reaches the lift 17 and it is transferred thereby to the overhead conveyor 11. The product carrying pallet then is transferred along the overhead conveyor 11 to the packaging and shipping area 18. Empty pallets are returned along the overhead conveyor from the packaging and shipping area 18.

At the same time, as component carriers at the various assembly stations are emptied, they are ejected onto the assembly line conveyor 16. These empty component carriers proceed directly to the lift 17 and are transferred to the overhead conveyor 11. They travel along the overhead conveyor 11 back to a respective sub-assembly area where they can be again loaded with parts. Full component carriers travel from the respective source areas over the overhead conveyor 11 and are directed to different ones of the storage facility 15. At each storage facility the associated crane 12 extracts the carrier 40 from the conveyor 11 and selectively places it in an apropriate storage location. Typically, the appropriate atorage location will not be the ready location directly opposite the carrier receiving area of the assembly station for which the parts within the carrier are destined. Typically there will be an intermediate transfer from a storage location into the ready location so that the carrier can be transferred directly across the assembly line 16 when it is needed at the assembly station.

Thus it should be apparent that the assembly line conveyor 16 transports parts and work in process carriers, the latter in both the full and empty conditions. Parts carriers travel on the assembly line conveyor in an empty condition; in the full condition they are only transferred directly across the conveyor 16. The random storage facility 15 functions as a storage and transporting device eliminating a necessity for a tansporter dedicated solely to parts, while at the same time relieving the conveyor 16 from the burden of transporting parts. By operating the random storage facility 15 with a queue of one loaded parts carrier directly opposite the carrier receiving area at which it will be required, we ensure that parts are always available. The crane 12 need only replace the transferred carrier within the time it will take to deplete the contents of the transferred carrier.

Each of the carriers (pallets for carrying work in process and for parts) includes a machine readable identification code. The control system (made up of a collection of interconnected computers, some of which are shown in the drawings) cooperates with the robotic work stations, the assembly line conveyors 16, the random storage facility 15 and the first conveyor 11 so as to maintain awareness of the position and load of each of the carriers. For example when a completed product is removed from a product supporting carrier at the packaging and shipping area 18, the control system identifies that particular carrier as being an empty product carrier. The carrier is then routed back to the random storage facility 15 by the first conveyor 11, and the identity of the carrier is used by the random storage facility 15 to select a suitable location in the array of locations 13 within which to store the particular carrier. In this fashion, when a carrier of the required type is necessary, the control system can identify which storage location in the array 13 includes an appropriate carrier, and transfer it to the needed location. Of course, if the particular carrier is transferred into the first assembly station, its characteristic changes in that, at least at the time it is ejected from the assembly station, it is no longer an empty carrier. The control system recieves information from each of the robot work stations on the condition of the product supported by the carrier as the carrier is received by and ejected from each of the various assembly stations. When the product is substantially complete, one of the asembly stations comprises a test station wherein the product supported by the carrier is tested. The results of the test are recorded in association with the identification of the carrier, so that thereafter as the carrier passes the reject station it can be rejected out of the assembly line 16 if in fact the product supported by the particular carrier has not successfully passed the test. On the other hand, if the product has passed the test, the control system keeps track of the carrier as it is routed over the lift 17 to the first conveyor 11 and on that conveyor to the packaging and shipping area 18 where it is again unloaded to repeat the process. Preferably, product carriers are not ejected from one station until such time as a ready location or a carrier receiving area of the next station is available.

Parts carriers are also tracked as they move throughout the system. As a parts carrier is loaded with a particular component, the control system associates the identification and perhaps the quantity of the parts supported by the carrier. As a result, when the carrier reaches the random storage facility 15, an appropriate location in the array of locations 13 can be identified and a carrier stored therein. The carrier may be transferred out of that location into the queue of one for the particular part. When the carrier is needed at the appropriate work station, since it is already pre-positioned, the only motion necessary is to transfer it across the assembly line conveyor 16 into the appropriate carrier receiving area. This transfer is, however, tracked by the control system, and the control system is notified when the components in the carrier have been depleted. At that point, the control system ensures that the carrier is ejected onto the assembly line conveyor 16. This allows the control system to route the carrier back to an appropriate sub-assembly area for reloading with additional component part. For those carriers which are moved by an operator, a reinduct station is provided. At this station carrier id is read, and reinduction is coodinated with other articles on the conveyor. It should be apparent that carriers need not be dedicated to particular subassembly areas, since the control system can associate the identification of any carrier with any component.

While the invention has been described with reference to a preferred embodiment, it should be apparent that many changes can be made without departing from the scope of the invention which is to be construed by the following claims.

Having thus described our invention, what we claim as new, and desire to secure by Letters Patent is:

1. A facility for automated assembly of a product comprising:
   a random storage facility having a plurality of individual storage locations and a plurality of ready locations, said ready locations being spatially separated along a line;
   assembly line conveyor means, including an assembly line conveyor, for transporting pallets and parts carriers in a single direction, said assembly line conveyor being positioned adjacent to said random storage facility and extending along said line of ready locations;
   first conveyor means for receiving parts carriers and transporting parts carriers to said random storage facility and for delivering assembled products, received from said assembly line conveyor, to a packaging and shipping area;
   a plurality of assembly stations positioned along said assembly line conveyor opposite to said storage facility, said assembly stations having a parts carrier receiving area for receiving parts carriers from said ready locations of said random storage facility, said assembly stations further having a work area for performing an assembly operation on work-in-process, said work-in-process comprised of said pallet and a partially assembled product;
   a plurality of work-in-process receiving areas for receiving said work-in-process, each of said work-in-process receiving areas associated with an assembly station and comprising one of said ready locations of said random storage facility;
   trnasporting means associated with said random storage facility for moving said parts carriers from said first conveyor means into one of said individual storage locations and for moving said parts carriers from one of said individual storage locations to one of said ready locations; and
   a plurality of transfer means, each of said transfer means associated with one of said assembly stations for moving said parts carriers from one of said ready locations to a parts carrier receiving area and for moving said work-in-process from said assembly line conveyor to one of said ready locations and for moving said work-in-process from said one of said ready locations to one of said work areas.

2. The facility of claim 1 in which one or more of said parts carrier receiving areas include eject means for placing a parts carrier located at said parts carrier receiving area onto said assembly line conveyor.

3. The facility of claim 1 in which one or more of said assembly stations includes means for extracting a component from a parts carrier located in said parts carrier receiving area and for assembling said component on a work-in-process located in said work area and for thereafter ejecting said work-in-process onto said assembly line conveyor.

4. The facility of claim 1 in which one or more of said work areas of said assembly stations includes lift means for elevating a partially assembled product off said pallet.

5. The facility of claim 1 in which there are one or more different source locations providing parts carriers to said first conveyor means, said parts carriers carrying parts for assembly at said assembly stations into a partially assembled product.

6. The facility of claim 1 in which said assembly line conveyor includes an inlet end and an outlet end so that work-in-process conveyed on said assembly line conveyor travels in a direction from said inlet end to said outlet end and wherein said outlet end is associated with a lift means for coupling the outlet end of said assembly line conveyor to said first conveyor means.

7. The facility of claim 1 in which said first and assembly line conveyors are displaced from one another in a generally vertical direction.

8. The facility of claim 1 which further includes:
   a duplicate assembly line conveyor means coupled to said first conveyor means, a duplicate random storage facility and a duplicate series of assembly stations, both said duplicate assembly line conveyor means and duplicate series of assembly stations are parallel to and spaced from said assembly line conveyor means and series of assembly stations, said random and duplicate random storage facilities directly adjacent one another.

9. The facility of claim 8 in which both said assembly line conveyor means and said duplicate assembly line conveyor means include inlet and outlet ends so that articles on each line travel in a direction from inlet to outle and wherein said directions for said lines are opposite to each other.

10. The facility of claim 1 which further includes:
    a duplicate random storage facility coupled to said first conveyor means, duplicate assembly line conveyor means and a duplicate series of assembly stations, all said duplicate asembly line conveyor means, duplicate random storage facility and duplicate series of assembly stations are parallel to and spaced from said assembly line conveyor means, random storage facility and series of assembly stations and adjacent to an aisle located between said assembly line conveyor means and said duplicate assembly line conveyor means.

11. The facility of claim 10 in which both said assembly line conveyor means and said duplicate assembly line conveyor means includes inlet and outlet ends so that articles on each line travel in a direction from inlet to outlet and wherein said directions for said lines are opposite to each other.

12. The facility of claim 1 in which said first conveyor means transports parts carriers from at least two different parts sources to said random storage facility.

13. The facility of claim 12 in which one of said source locations supplies pallets.

14. The facility of claim 1 in which said first conveyor means is located vertically above said assembly line conveyor and said assembly stations, and
    said assembly stations are spaced apart along said assembly line conveyor to provide access to each of said assembly stations from a plurality of first regions, each of said first regions lying between pairs of said assembly stations, and a second region located directly adjacent to an assembly station and on a side opposite from said assembly line conveyor.

15. The facility of claim 1 wherein one or more of said work areas include eject means for placing said work-in-process, located at said work area, onto said assembly line conveyor.

16. The facility of claim 6 wherein said assembly stations include a first station associated with said inlet end of said assembly line conveyor in which an empty pallet carrier loaded with empty pallets is located in a parts carrier receiving area, and said first station further comprising means for placing an empty pallet on said work area and means for extracting an initial component from a parts carrier and placing said component on said empty pallet located in said work area.

17. The facility of claim 1 wherein said assembly stations include a first station in which a pallet carrier loaded with empty pallets is located in a parts carrier receiving area, and said first station further comprising means for placing an empty pallet on said work area nd means for extracting an initial component from a parts carrier and placing said component on said empty pallet located in said work area.

18. The facility of claim 1 further including a source of empty pallets coupled to said first conveyor means.

* * * * *

UNITED STATES PATENT AND TRADEMARK OFFICE
CERTIFICATE OF CORRECTION

PATENT NO. : 4,722,653

DATED : February 2, 1988

INVENTOR(S) : Williams et al

It is certified that error appears in the above-identified patent and that said Letters Patent is hereby corrected as shown below:

Col. 1, line 27, "selectly" should be -selectively-;

line 28, "elimiante" should be -eliminate.

Col. 2, line 11, "workpiece" should be -workpieces-;

line 44, "station" should be -stations-.

Col. 3, line 21, "in to" should be -into-;

line 50, "assemlby" should be -assembly-.

Col. 4, line 51, "are" should be -area-;

line 57, "fianl" should be -final-.

Col. 5, line 14, "0or" should be -or-;

line 27, "identified" should be -identifies-;

line 30, "carriers" (second) should be -Carriers-.

Col. 6, line 10, "efficinet" should be -efficient-;

line 39, "lines" should be -line-;

line 45, "communate" should be -communicate-;

line 50, "overhread" should be -overhead-.

Col. 7, line 2, "stations" should be -station-;

line 12, "the" (first) should be -The-;

UNITED STATES PATENT AND TRADEMARK OFFICE
CERTIFICATE OF CORRECTION

PATENT NO. : 4,722,653

DATED : February 2, 1988

INVENTOR(S) : Williams et al

It is certified that error appears in the above-identified patent and that said Letters Patent is hereby corrected as shown below:

Col. 7, line 24, "with" should be --which--;

line 30, "refere" should be --refer--;

line 41, "lines" should be --line--.

Col. 8, line 21, "being" should be --begin--.

Col. 10, line 25, "components" should be --component--;

line 27, "the" (first) should be --that--;

line 29, "laoded" should be --loaded--;

lines 47-48, "predeccessor" should be --predecessor--;

line 52, "the" (second) should be --The--.

Col. 11, line 34, "apropriate" should be --appropriate--;

line 35, "atorage" should be --storage--;

line 50, "tansporter" should be --transporter--.

Col. 12, line 16, "recieves" should be --receives--;

line 58, "coodinated" should be --coordinated--.

Col. 13, line 35, "trnasporting" should be --transporting--.

UNITED STATES PATENT AND TRADEMARK OFFICE
CERTIFICATE OF CORRECTION

PATENT NO. : 4,722,653

DATED : February 2, 1988

INVENTOR(S) : Williams et al

It is certified that error appears in the above-identified patent and that said Letters Patent is hereby corrected as shown below:

Col. 14, line 25, "outle" should be --outlet--.

Col. 16, line 2, "nd" should be --and--.

Signed and Sealed this

Fifth Day of July, 1988

Attest:

DONALD J. QUIGG

Attesting Officer

Commissioner of Patents and Trademarks